US012052547B2

(12) United States Patent
Obradovic et al.

(10) Patent No.: US 12,052,547 B2
(45) Date of Patent: *Jul. 30, 2024

(54) DAMPING FILTER FOR A HEARING DEVICE

(71) Applicant: GN Hearing A/S, Ballerup (DK)

(72) Inventors: Gojko Obradovic, Copenhagen S (DK); Poul Rosenkilde Kristensen, Roskilde (DK); Finn Hansen, Smørum (DK)

(73) Assignee: GN HEARING A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,616

(22) Filed: Apr. 17, 2023

(65) Prior Publication Data

US 2023/0262398 A1 Aug. 17, 2023

Related U.S. Application Data

(63) Continuation of application No. 17/374,725, filed on Jul. 13, 2021, now Pat. No. 11,653,154.

(30) Foreign Application Priority Data

Aug. 3, 2020 (DK) .......................... PA 2020 70511

(51) Int. Cl.
*H04R 25/00* (2006.01)

(52) U.S. Cl.
CPC .................................. *H04R 25/45* (2013.01)

(58) Field of Classification Search
CPC .......... H04R 25/00; H04R 25/45; H04R 1/10
USPC ......................................... 381/312, 317, 74
See application file for complete search history.

(56) References Cited

U.S. PATENT DOCUMENTS

| | | | |
|---|---|---|---|
| 8,054,985 | B2 | 11/2011 | Doty |
| 2005/0190942 | A1 | 9/2005 | Moquin |
| 2008/0165981 | A1 | 7/2008 | Wurtz |
| 2017/0111731 | A1 | 4/2017 | Merks-Swolfs |
| 2018/0317025 | A1 | 11/2018 | Mimoun et al. |
| 2020/0059739 | A1 | 2/2020 | Weibel et al. |

(Continued)

FOREIGN PATENT DOCUMENTS

| | | |
|---|---|---|
| CN | 202773031 | 3/2013 |
| EP | 1653767 | 5/2006 |
| EP | 2280557 | 2/2011 |

(Continued)

OTHER PUBLICATIONS

Non-Final Office Action for U.S. Appl. No. 17/374,725 dated Jun. 20, 2022.

(Continued)

*Primary Examiner* — George C Monikang

(74) *Attorney, Agent, or Firm* — Vista IP Law Group, LLP

(57) ABSTRACT

The present disclosure relates to a hearing device having a microphone, where most of the microphone is shielded by an outer shielding of the hearing device. An inlet in the outer shielding allows sound from outside the hearing aid to travel to the microphone to be picked up by it. However, the combination of the microphone and the inlet results in the microphone becoming more sensitive at some audible frequencies. A damping filter positioned in connection with the inlet acts to counter the acoustic effect of the inlet by damping sound in the audible frequency range, where the microphone has increased sensitivity.

24 Claims, 4 Drawing Sheets

(56) References Cited

U.S. PATENT DOCUMENTS

2020/0095392 A1 3/2020 Acharya et al.

FOREIGN PATENT DOCUMENTS

| | | |
|---|---|---|
| EP | 2434780 | 4/2016 |
| GB | 1296019 | 11/1972 |
| GB | 2064265 | 6/1981 |
| JP | 2006-50174 | 2/2006 |

OTHER PUBLICATIONS

Amendment Response to NFOA for U.S. Appl. No. 17/374,725 dated Oct. 18, 2022.
Notice of Allowance for U.S. Appl. No. 17/374,725 dated Jan. 25, 2023.
Foreign Technical Exam for Danish Patent Appln. No. PA 2020 70511 dated Feb. 2, 2021.
Foreign Technical Exam for Danish Patent Appln. No. PA 2020 70511 Jul. 7, 2021.
Foreign Technical Examination for Danish Patent Appln. No. PA 2020 70511 dated Nov. 8, 2021.
Extended European Search Report for EP Patent Appln. No. EP 211820346.9 dated Dec. 21, 2021.

DAMPING FILTER FOR A HEARING DEVICE

RELATED APPLICATION DATA

This application is a continuation of U.S. patent application Ser. No. 17/374,725 filed on Jul. 13, 2021, which claims priority to, and the benefit of, Danish Patent Application No. PA 2020 70511, filed on Aug. 3, 2020. The entire disclosures of the above applications are expressly incorporated by reference herein.

FIELD

The present disclosure relates to a hearing device having a microphone, an inlet and a damping filter within the inlet.

Further, the disclosure relates to a method of configuring a hearing device with a damping filter.

BACKGROUND

Hearing devices, such as hearing aids, headsets, etc., have one or more microphones, which are positioned within a cover or shielding of some kind and where the one or more microphones receive sound via an inlet or aperture in the cover or shielding. Sound from outside the hearing aid then travels through the inlet to reach the microphone. The shielding makes the hearing device more robust and protects fragile parts such as electronic components forming part of the hearing device. The sound that is picked up by the microphone is digitised, possibly processed in various ways and then transmitted to a speaker residing inside, or close to, the ear canal of a person.

However, the presence of the inlet affects the performance of a microphone due to the acoustic loading of the inlet, which results in the microphone becoming more sensitive at some audible frequencies. This effect is undesirable for several reasons. For one, the hearing device microphone should preferably allow for as faithful a reproduction of sound as possible, which requires that the sensitivity of the microphone is the same or close to the same for all audible frequencies. Additionally, the sound picked up by the microphone may be altered by the gain, due to uneven microphone sensitivity, and hence pose a potential problem for the hearing aid stability.

Thus, there is a need in the art for a hearing device in which the effect of the inlet on the microphone is reduced or eliminated.

SUMMARY

Disclosed herein is a hearing device having a microphone, where most of the microphone is shielded by an outer shielding of the hearing device. An inlet in the outer shielding allows sound from outside the hearing aid to travel to the microphone to be picked up by it. However, the combination of the microphone and the inlet results in the microphone becoming more sensitive at some audible frequencies. A damping filter positioned in connection with the inlet acts to counter the acoustic effect of the inlet by damping sound in the frequency range, where the microphone has increased sensitivity.

In a first aspect is provided a hearing device comprising a microphone, an outer shielding configured to shield components within the device, and a damping filter. The outer shielding comprises an inlet channel configured to conduct sound from the outside of the device to the microphone. The inlet channel has an outer opening through which sound from the outside enters and an inner opening through which sound arrives at the microphone. The damping filter is positioned in connection with the inlet such that sound being conducted by the inlet passes through the damping filter, and is configured to acoustically dampen the sound arriving at the microphone via the inlet channel so as to at least partially counteract the increased sensitivity of the microphone at audible frequencies due to the acoustic effect of the inlet channel.

The hearing device may comprise more than one microphone. For example, hearing aids often have two or more microphones and usually each microphone will have its own inlet. The inlet channel extends between the outer and inner openings and may have any shape that allows sound to be conducted from the outside and to the microphone. The inlet channel may have different shapes and/or cross-sections along the channel, such as e.g. varying diameter. Generally, the narrower the inlet the larger the acoustic effect on the frequency response of the microphone. Thus, the acoustic effect may be lessened by making the inlet wider. However, for microphone inlets in hearing devices, the size cannot be increased enough, while maintaining its function, to avoid an acoustic effect on the frequency response of the microphone.

The inlet, which will often be of the order of 0.4-4 mm in diameter in hearing devices also presents a way for environmental substances such as water, grit, dust, etc. to affect the functioning of the hearing device as the substances may enter the inlet. In some hearing devices an environmental filter is placed within the inlet to reduce the possibility of such environmental substances damaging or hampering the function of the hearing device. To keep out undesired substances an environmental filter would ideally have a very small pore size, but at some point the pore size becomes small enough that the filter is not acoustically neutral and the environmental filters are therefore chosen to have a larger pore size than the ideal to ensure that the environmental filter is acoustically neutral.

The damping filter is configured to acoustically dampen sound in the frequency range, where the microphone has increased sensitivity. By its presence and filter structure, the damping filter will also act as an environmental filter to some degree. An environmental filter, though, is designed to be acoustically transparent, which the damping filter is not. However, by damping the sound in the frequency range, where the inlet causes increased sensitivity, the combination of the inlet and the damping filter approaches being acoustically transparent.

An additional benefit of the damping filter is that it may also dampen sound at ultrasound frequencies. While ultrasound frequencies are normally not heard by humans, they can saturate microphones and create problems in the delicate sensors and electronics of the hearing device. Thus, dampening of ultrasound frequencies is a desired effect in hearing devices.

The presence of the damping filter in connection with the inlet channel will create noise and in some embodiments, the damping filter configuration is an optimization of the trade-off between the damping and the noise created by the damping filter. The amount of noise created will be dependent on the filter type and the effective filter area. Generally, the smaller the effective filter area is, the more noise will be created. Thus, this may also be a factor when configuring the damping filter.

The response of the microphone to the presence of the inlet may differ for each type and model of microphone and so a configuration of damping filter, which has a desirable effect when combined with one type and model of microphone will possibly have a lesser effect in combination with another type of microphone. Therefore, a damping filter will likely need to be configured for each type and/or model of microphone.

An additional advantage of the damping filter is its response to clogging, which any filter will experience to some degree over time. The increase in sensitivity of the microphone due to the presence of the inlet presents itself as a peak in the frequency response of the microphone. As the damping filter gets clogged, the cross-section of the inlet at the position of the filter area will decrease, which has the effect of the peak in the frequency response moving towards lower frequencies, i.e. the increase in sensitivity shifts towards lower frequencies. However, the clogging of the damping filter will lead to an increase in damping, which means that the shifted peak will be still be dampened even though the damping filter was designed to dampen sound at higher frequencies.

The damping filter is positioned such that sound being conducted by the inlet passes through the damping filter. In some embodiments, the damping filter is positioned between the outer and inner openings. The damping filter may alternatively be positioned on top of the inlet, i.e. on the outer side of the outer opening. When positioned on top of the inlet, the damping filter is not protected by having the inlet surrounding it. To protect a damping filter positioned on top of the inlet a mechanical grid may be placed on top of the surface mounted filter. The mechanical grid may be configured to have zero acoustical effect so as to have the sole purpose of protecting the damping filter from mishandling.

In some embodiments, the damping filter extends entirely or at least partially across the inlet channel. The damping filter may extend across the inlet channel at a right, obtuse or acute angle with respect to the wall of the inlet channel at the position of the damping filter. It may extend so as to cover the entire cross-section of the inlet channel or extend to only partially cover the cross-section of the inlet channel at the position where the damping filter is positioned. If the damping filter does not cover the entire cross-section of the inlet channel, the sound being conducted by the channel has a way around the damping filter and the damping filter will be less effective. However, if the opening created by the lack of damping filter coverage is small, it is possible that the efficiency of the damping filter is not compromised significantly.

In some embodiments, the damping filter is configured by predetermined values of one or more filter parameters, the one or more filter parameters being one or more of: effective filter area, pore size, filter thickness and distance from microphone.

The effective filter area is the area of the damping filter through which sound may pass to reach the microphone. The shape of the effective filter area will depend on the shape of the inlet channel, but will often be a circle or an oval depending on the angle of the damping filter, as the inlet channel will often have an oval or circular cross-section.

The actual total size of the filter used in the assembly may be larger than the effective filter area. For assembly a larger filter may be used, where part of it is covered by the surrounding structure such that the covered part does not function in terms of acoustic performance. This is one way of assembling the hearing aid to have an inlet with a damping filter of a desired effective filter area in a desired position within the inlet channel.

In some embodiments, the effective filter area is within the range 0.1 $mm^2$-13 $mm^2$, such as within the range 0.19-3.15 $mm^2$, such as within the range 0.19-1.77 $mm^2$. If the inlet channel is circular in shape, this will correspond to radii of approximately 0.2 mm-2 mm, respectively, for a damping filter placed in a straight cross-section of the circular inlet channel.

In some embodiments, the pore size of the damping filter is within the range 5-25 mu, such as within the range 5-15 mu, such as within the range 5-10 mu, where mu is micrometre.

The damping filter will have a thickness, which for simple filter shapes is the length of filter material that sound has to travel through. In some embodiments, the filter thickness is within the range 5-2500 mu, such as within the range 20-200 mu. Generally, the larger the pore size and effective filter area, the thicker the damping filter has to be to achieve the desired damping. Thus, the smaller the pore size and effective filter area, the thinner the damping filter can be. One or more filters could be stacked to increase the effective thickness of the damping filter.

Positioning of the damping filter in connection with the inlet channel can also influence the damping achieved by the presence of the damping filter in the inlet channel. Generally, when the damping filter is positioned farther from the microphone, i.e. the distance from microphone to damping filter is relatively large, the damping filter will generate more damping than if it is positioned closer to the microphone.

In some embodiments, the damping filter may comprise more than one filter, where a resultant acoustic damping is achieved by the plurality of filters comprised in the damping filter. The plurality of filters may be separated by space, wherein no filter material is present or be positioned abutting each other. If the plurality of filters have similar properties, abutting them will acoustically resemble a single filter having the total thickness of the abutting filters. However, each of the filters in the plurality of filters may have dissimilar properties such as different pore sizes, effective filter areas and filter thicknesses. The filters may also be made of different materials.

The frequencies, which are normally audible for the human ear are approximately in the range 20 Hz to 20 kHz. For the dimensions and structure of hearing devices, the increase in sensitivity will usually be in the higher range of the audible frequencies. Therefore, when this is the case, the damping filter should dampen in this range of audible frequencies and in some embodiments, the damping filter dampens at one or more audible frequencies within the frequency range 3-20 kHz. Further, in some embodiments, the damping by the damping filter is at least 1 dB or at least 2 dB at one or more audible frequencies within the frequency range 3-20 kHz. In some embodiments, the damping by the damping filter is at least 5 dB or at least 10 dB at one or more audible frequencies within the frequency range 3-20 kHz.

In the following aspect, the terms and features relate to the terms and features having the same name as in the first aspect and therefore the descriptions and explanations of terms and features given above apply also to the following aspect.

A second aspect relates to a method of configuring a hearing device. The hearing device comprises a microphone, and an outer shielding, which is configured to shield components within the device. The outer shielding comprises an inlet channel configured to conduct sound from the outside of the device to the microphone. The inlet channel has an outer opening through which sound from the outside enters and an inner opening through which sound arrives at the microphone. The method comprises:

- simulating or measuring the frequency response of the microphone under the acoustic effect of the inlet channel,
- configuring a damping filter such that, when installed, the damping filter will acoustically dampen the sound arriving at the microphone via the inlet channel so as to at least partially counteract the increased sensitivity of the microphone at audible frequencies due to the acoustic effect of the inlet channel, and
- positioning the damping filter in connection with the inlet such that the sound being conducted by the inlet passes through the damping filter.

The frequency response of the microphone is simulated or measured, e.g as voltage level (dBV) versus frequency or relative response (dB) versus frequency.

Configuration of the damping filter may comprise computer simulations to determine suitable parameters, which characterise the filter and obtain the desired effect of acoustically damping the sound arriving at the microphone via the inlet channel in such a way that the audible frequencies, which are otherwise intensified due to the acoustic effect of the inlet, are dampened. In some embodiments, the step of configuring the damping filter comprises determining one or more filter parameters, the one or more filter parameters being one or more of: effective filter area, pore size, filter thickness and distance from microphone.

Three of the filter parameters are inherent to the damping filter: effective filter area, pore size, and filter thickness, while the distance from the microphone is a parameter that is used during assembly. Thus, positioning the damping filter in connection with the inlet channel may comprise positioning the damping filter at a distance from the microphone determined during the configuration of the damping filter. In an embodiment, the damping filter is positioned within the inlet channel between the inner opening and outer opening.

In some embodiments, the damping filter is configured to dampen at one or more audible frequencies within the frequency range 3-20 kHz.

In some embodiments, the damping by the damping filter is at least 1 dB or at least 2 dB at one or more audible frequencies within the frequency range 3-20 kHz.

In some embodiments, the filter configuration is an optimization of the trade-off between the damping and the noise created by the damping filter.

In some embodiments, the installed damping filter extends entirely or at least partially across the inlet channel.

BRIEF DESCRIPTION OF THE DRAWINGS

In the following exemplary embodiments are described in more detail with reference to the appended drawings, wherein.

DETAILED DESCRIPTION

Figure 1:
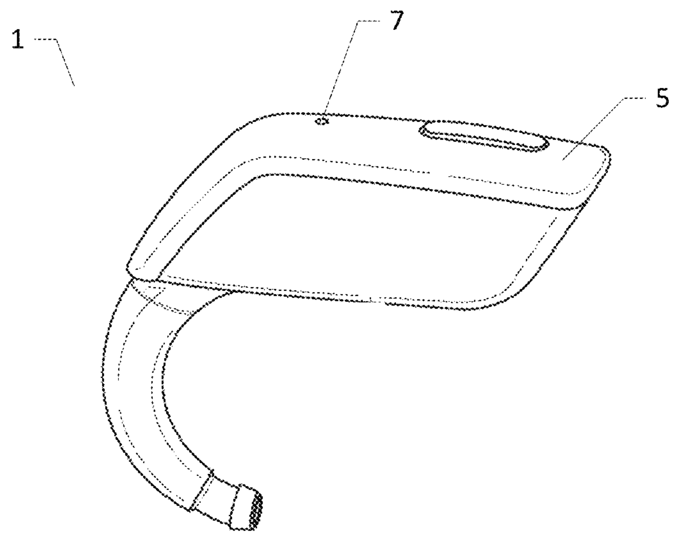
FIG. 1 shows a simplified drawing of an exemplary hearing aid having a microphone inlet.

Various exemplary embodiments and details are described hereinafter, with reference to the figures when relevant. It should be noted that the figures may or may not be drawn to scale and that elements of similar structures or functions are represented by like reference numerals throughout the figures. Like elements will, thus, not necessarily be described in detail with respect to each figure. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 shows a simplified drawing of a hearing device 1 exemplified as a behind-the-ear part of a receiver-in-ear hearing aid 1. The hearing aid 1 has a microphone (not visible), which is shielded by an outer shielding 5 from mechanical damage and harmful substances. The outer shielding 5 has an inlet with an outer opening 7. The inlet conducts sound from the environment outside of the hearing aid 1 to the microphone within the outer shielding 5 of the hearing aid 1. The presence of the inlet conducting sound to the microphone has an acoustic effect such that the combined system of the inlet and the microphone effectively makes the microphone more sensitive to some frequencies of sound.

Figure 2:
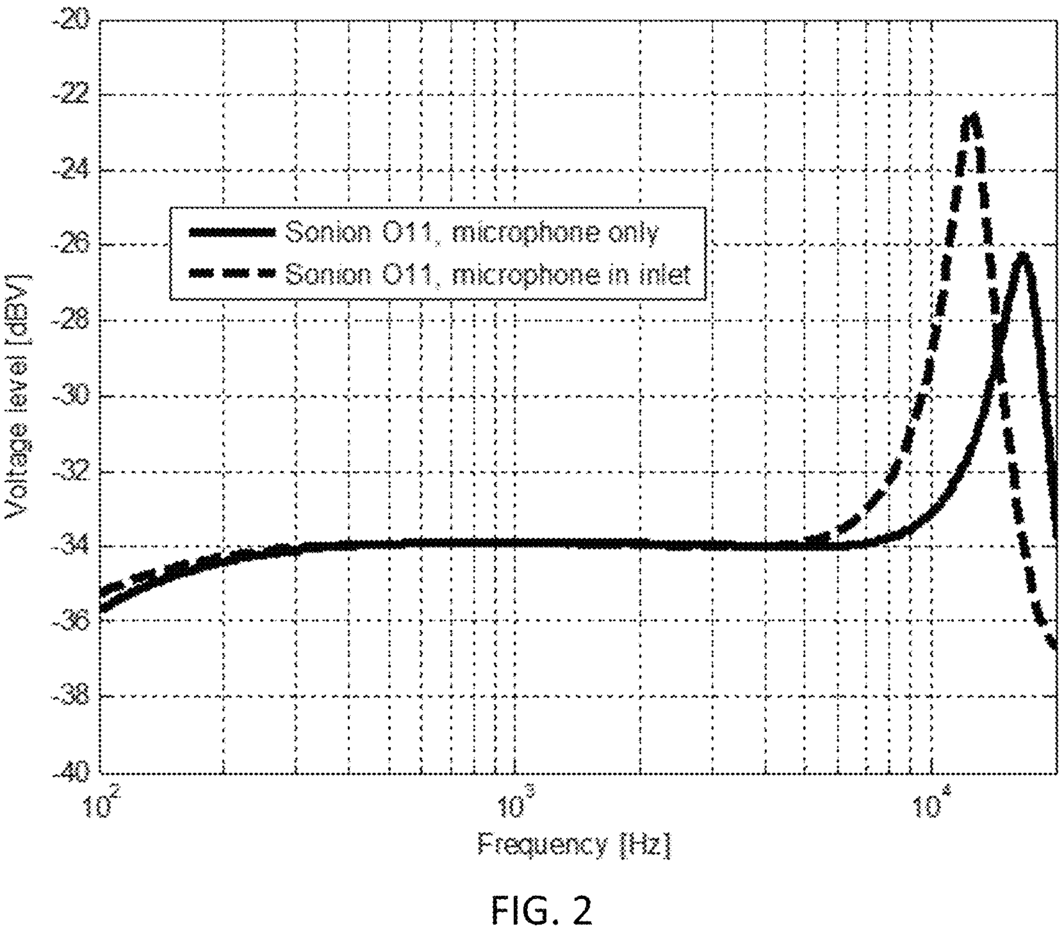
FIG. 2 shows a graph of the simulated frequency response of a microphone for a hearing device when affected by the acoustic effect of an inlet.

FIG. 2 shows a graph of the simulated frequency response of a microphone. Microphones, which are different models, and particularly, different types will have a dissimilar frequency response. When the microphone is positioned with an inlet, the frequency response is altered as shown in the graph. When affected by the acoustic effect of an inlet this particular microphone displays an undesirable increased sensitivity to sound at frequencies above approximately 6 kHz.

Figure 3:
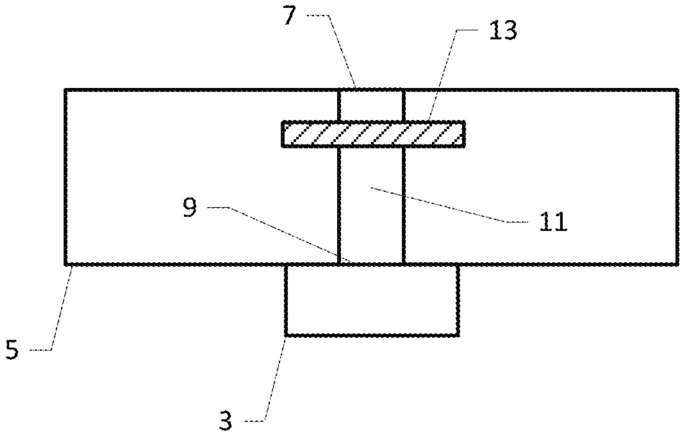
FIG. 3 shows a simplified drawing of a microphone for a hearing device behind an outer shielding having an inlet with a damping filter according to an embodiment.

FIG. 3 shows a simplified drawing of a microphone 3 positioned behind an outer shielding 5 having an inlet comprising an outer opening 7, an inner opening 9 and an inlet channel 11 extending between the inner opening 9 and the outer opening 7. The inlet conducts sound from outside the outer shielding 5 via the inlet channel 11 to the microphone 3.

The presence of the inlet affects the frequency response of the microphone 3 as illustrated by the graph in FIG. 2. The inlet therefore further comprises a damping filter 13, which is positioned within the inlet channel 11 and which is configured to counteract the acoustic effect of the inlet, which is an increased sensitivity of the microphone at audible frequencies. This is achieved by the damping filter 13 acting as an acoustic damper. Some of the parameters, which affect the damping produced by the damping filter 13, are effective filter area, pore size, filter thickness and distance of the filter 13 from the microphone 3.

The damping filter 13 is installed in the inlet channel 11 as a filter extending beyond the cross-section of the inlet channel 11. This is an example of how the damping filter 13 can be installed during assembly of the hearing device 1. The part of the filter, which extends into the outer shielding 5 does not form part of the effective filter area of the damping filter 13. The damping filter 13 may be installed in other ways known to the skilled person.

A damping filter 13 will preferably extend entirely across the inlet channel 11 such that the sound being conducted by the inlet has to pass through the damping filter 13. However, the damping filter 13 may extend only partially across the inlet channel 11 and still serve it's function, i.e. without the damping of the damping filter 13 being compromised to an unacceptable degree.

The damping filter 13 is simplistically illustrated in FIG. 3 as positioned at a right angle across a simple inlet channel 11 without varying cross-section. However, the damping filter 13 may be positioned at an angle with respect to the wall of the inlet channel 11. Also, the inlet channel 11 may have a varying cross-section. Further, the damping filter 13 may comprise more than one filter, where a resultant acoustic damping is achieved by the plurality of individual filters comprised in the damping filter 13.

Figures 4A, 4B, 4C:
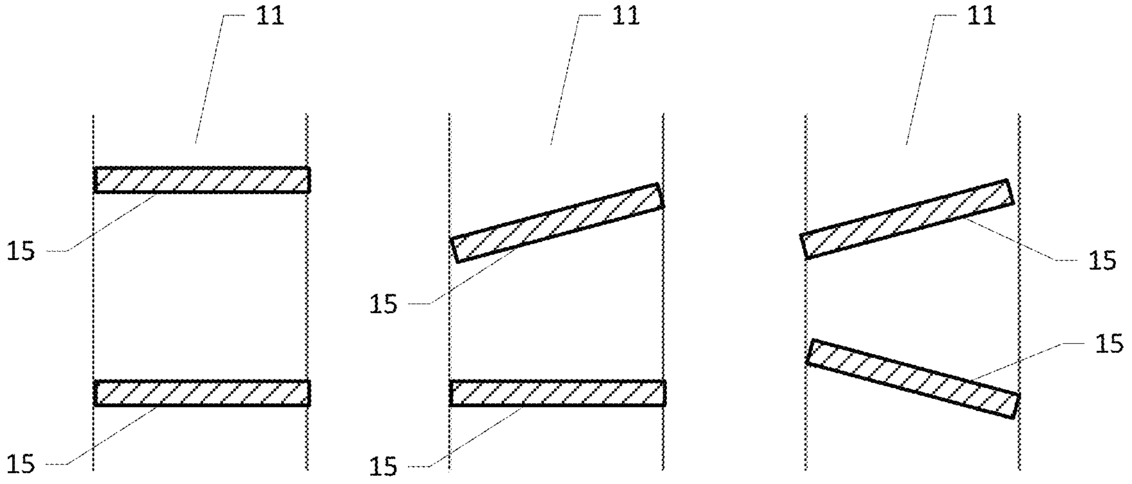
FIGS. 4A, 4B and 4C are simplified drawings of a damping filter positioned within an inlet channel according to some embodiments.

FIGS. 4A, 4B and 4C show simplified drawings of a damping filter 13 comprising a plurality of individual filters 15 positioned within an inlet channel 11 according to some embodiments. The individual filters 15 may be separated by space, wherein no filter material is present or be positioned abutting each other. If the individual filters 15 have similar properties, abutting them will acoustically resemble a single filter of the total thickness of the abutting filters. However, the individual filters 15 may have dissimilar properties such as different pore sizes, effective filter areas and filter thicknesses. The individual filters 15 may also be made of different materials.

In FIG. 4A is shown a damping filter 13 comprised of two individual filters 15 separated by a space, wherein no filter material is present. The two filters 15 are positioned at right angles to the wall of the inlet channel 11, which has a constant cross-section.

FIG. 4B shows a damping filter 13 comprised of two individual filters 15, where one of the two filters 15 are positioned at a right angle to the wall of the inlet channel 11, while the other of the individual filters 15 is positioned within the inlet channel 11 at an angle that is not 90 degrees with respect to the inlet channel wall.

FIG. 4C illustrates a damping filter 13 comprised of two individual filter 15, where both filters 15 are positioned within the inlet channel 11 at angles that are not 90 degrees with respect to the inlet channel wall.

Figure 5:
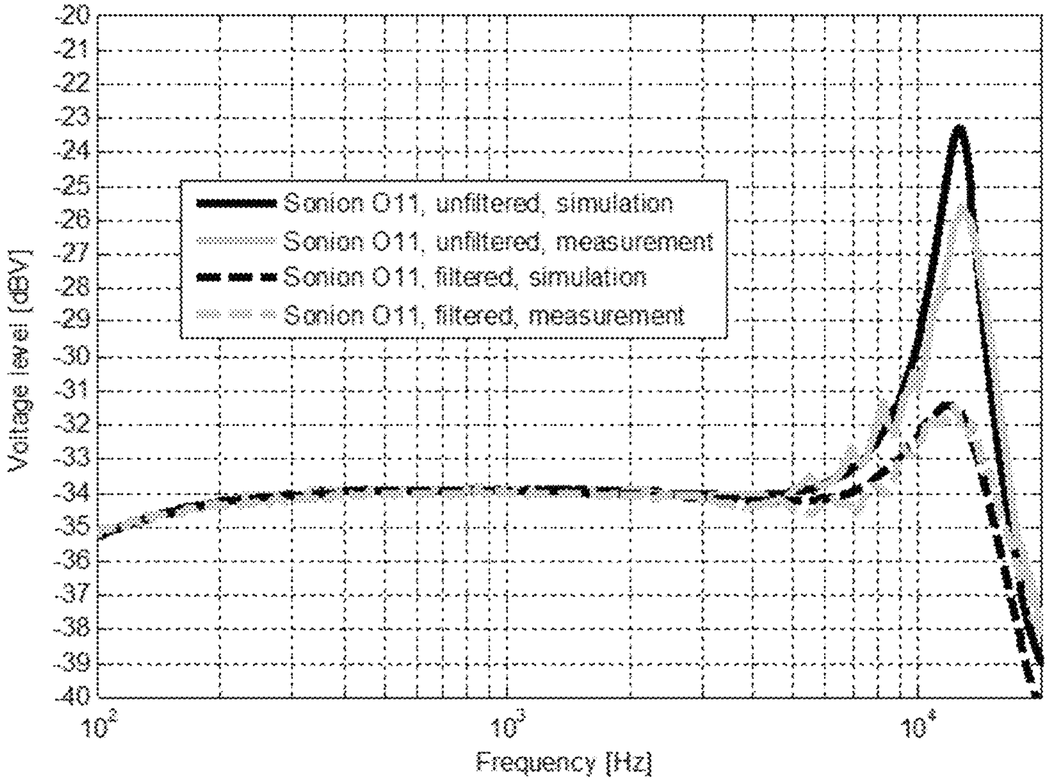
FIG. 5 shows a graph of simulated and measured frequency response at audible frequencies of a microphone for a hearing device with and without a damping filter.

FIG. 5 shows a graph of the simulated and measured frequency response at audible frequencies of a microphone for a hearing device installed with an inlet to conduct sound to the microphone. When no damping filter is installed a relatively large peak is seen at the high frequency end of the audible spectrum (compare with FIG. 2). The unfiltered frequency response with a large peak is undesirable, but can be mitigated by installing a damping filter in connection with the inlet. The damping filter is configured to dampen the sound in the range, where the presence of the inlet causes increased sensitivity of the microphone. The effect is to dampen the peak, which will make the graph of the frequency response "flatter", i.e. with a smaller range of level values, which is desirable in hearing devices. As shown in FIG. 5, the effect of the damping filter can be significant.

As the peak will usually be in the higher range, such as e.g. 3-20 kHz, of the audible frequencies for hearing device microphone inlets, such as a hearing aid microphone inlet, the damping filter is designed to dampen in this range of audible frequencies.

The microphone model shown in FIG. 5 was successfully dampened more than 7 dB at the frequency of the peak maximum.

Figure 6:
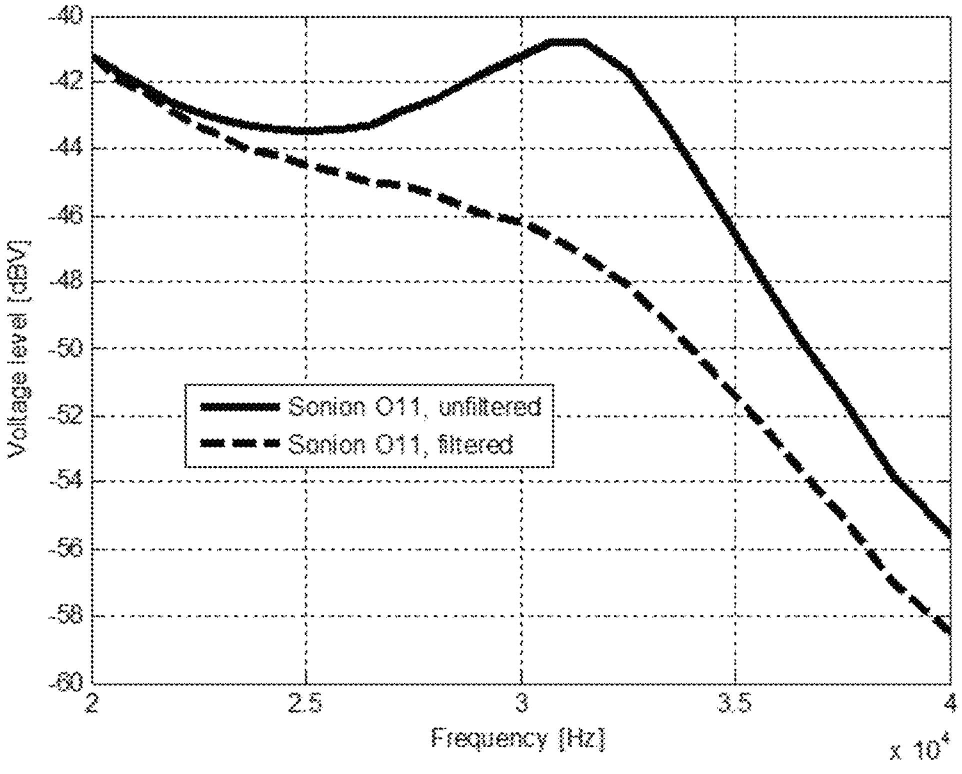
FIG. 6 shows a graph of the measured frequency response at ultrasound frequencies of a microphone for a hearing device with and without a damping filter.

FIG. 6 shows a graph of the measured frequency response at ultrasound frequencies of a microphone for a hearing device installed with an inlet to conduct sound to the microphone. As an additional benefit of the damping filter, when damping at high frequencies in the audible spectrum, is that it will likely also dampen at ultrasound frequencies. In FIG. 6 can be seen damping by a damping filter of at least 1-2 dB and even more than 4 dB at frequencies in the ultrasound spectrum. Damping of ultrasound in hearing devices is desirable, as the ultrasound can saturate microphones and create problems in the delicate sensors and electronics of the hearing device.

Figure 7:
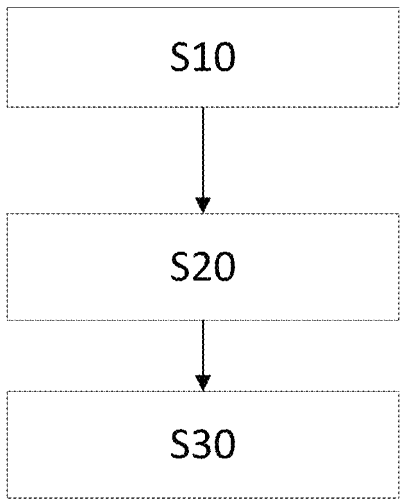
FIG. 7 shows a flow diagram in accordance with exemplary embodiments.

FIG. 7 shows a flow diagram in accordance with exemplary embodiments. The flow diagram illustrates a method of configuring a hearing device, wherein a damping filter is used in connection with a microphone inlet to counteract the acoustic effect of the inlet on the frequency response of the microphone. The damping filter may e.g. be any of the embodiments described herein.

The hearing device comprises a microphone, and an outer shielding, which is configured to shield components within the device. The outer shielding comprises an inlet channel configured to conduct sound from the outside of the device to the microphone. The inlet channel has an outer opening through which sound from the outside enters and an inner opening through which sound arrives at the microphone.

In step S10, the frequency response of the microphone is simulated or measured under the acoustic effect of the inlet channel.

In step S20, a damping filter is configured such that, when installed, the damping filter will acoustically dampen the sound arriving at the microphone via the inlet channel so as to at least partially counteract the increased sensitivity of the microphone at audible frequencies due to the acoustic effect of the inlet channel.

The system comprising a microphone and an inlet may be simulated with the inlet simulated as a transmission line of optionally varying diameter and the damping filter modelled as simple resistance. The resistance will then be proportional to the effective filter area of the damping filter such that the effective filter area can be tuned in simulation by tuning the resistance. This assumption is valid in the audio band, whereas at ultrasonic frequencies the damping filter may start behaving as a membrane.

As the filter introduces noise, the filter configuration may be an optimization of the trade-off between the damping and the noise created by the damping filter.

One or more parameters may be fixed, for example the pore size of the damping filter could be fixed and from the simulation an effective filter area can be determined to reach a desired damping.

In step S30, the damping filter is positioned in connection with the inlet channel between the inner opening and outer opening.

LIST OF REFERENCES

1 Hearing device
3 Microphone

5 Outer shielding
7 Outer opening
9 Inner opening
11 Inlet channel
13 Damping filter
15 Individual filter comprised in damping filter

The invention claimed is:

1. A hearing device comprising:

a microphone;

a shielding, the shielding comprising a channel configured to conduct sound from outside of the hearing device, the channel having an outer opening through which the sound from the outside can enter, and an inner opening for outputting the sound; and a damping filter positioned in connection with the channel such that the sound being conducted by the channel can pass through the damping filter, wherein the damping filter is configured to acoustically dampen the sound before the sound arrives at the microphone;

wherein the damping filter is configured to provide a sound damping at a frequency below 20 Hz.

2. The hearing device according to claim 1, wherein the damping filter extends entirely or at least partially across the channel.

3. The hearing device according to claim 1, wherein the damping filter is associated with one or more filter parameters, the one or more filter parameters being an effective filter area, a pore size, a filter thickness, a distance from the microphone, or any combination of the foregoing.

4. The hearing device according to claim 1, wherein the damping filter has an effective filter area that is anywhere from 0.1 $mm^2$-13 $mm^2$.

5. The hearing device according to claim 1, wherein the damping filter has an effective filter area that is anywhere from 0.19 $mm^2$-3.15 $mm^2$.

6. The hearing device according to claim 1, wherein the damping filter has an effective filter area that is anywhere from 0.19 $mm^2$-1.77 $mm^2$.

7. The hearing device according to claim 1, wherein the damping filter has a pore with a pore size that is anywhere from 5 mu-25 mu.

8. The hearing device according to claim 1, wherein the damping filter has a filter thickness that is anywhere from 5 mu-2500 mu.

9. The hearing device according to claim 1, wherein the damping filter has a filter thickness that is anywhere from 20 mu-200 mu.

10. The hearing device according to claim 1, wherein the damping filter is configured to acoustically dampen the sound at the frequency that is anywhere from 3 kHz-20 kHz.

11. The hearing device according to claim 1, wherein the damping filter is within the channel between the inner opening and the outer opening.

12. The hearing device according to claim 1, wherein the shielding is configured to shield one or more components in the hearing device.

13. The hearing device according to claim 1, wherein the damping filter is configured to at least partially counteract an increased sensitivity of the microphone at audible frequencies due to acoustic effect of the channel.

14. The hearing device according to claim 1, wherein the damping filter is configured to provide the sound damping that is at least 1 dB at the frequency below 20 kHz.

15. The hearing device according to claim 1, wherein the damping filter is configured to provide the sound damping that is at least 2 dB at the frequency below 20 kHz.

16. The hearing device according to claim 1, wherein the damping filter is configured to provide the sound damping that is at least 5 dB at the frequency below 20 kHz.

17. The hearing device according to claim 1, wherein the shielding comprising the channel extends in a primary direction that is non-parallel to a longitudinal axis of the channel.

18. The hearing device according to claim 1, wherein the damping filter is configured to also provide a sound damping at an ultrasound frequency.

19. A method performed by a hearing device, the hearing device comprising a microphone, and a shielding, the shielding comprising a channel, the channel having an outer opening and an inner opening, the method comprising:

receiving sound by the outer opening of the channel;

conducting the sound by the channel;

outputting the sound via the inner opening of the channel; and acoustically dampening the sound by a damping filter before the sound arrives at the microphone;

wherein the damping filter is configured to provide a sound damping at a frequency below 20 kHz.

20. The method according to claim 19, wherein the damping filter extends entirely or at least partially across the channel.

21. The method according to claim 19, wherein the damping filter is associated with one or more filter parameters, the one or more filter parameters being an effective filter area, a pore size, a filter thickness, a distance from the microphone, or any combination of the foregoing.

22. The method according to claim 19, wherein the frequency is anywhere from 3 kHz to 20 kHz.

23. The method according to claim 19, wherein the sound is dampened by at least 1 dB at the frequency that is below 20 kHz.

24. The method according to claim 19, wherein the damping filter is within the channel between the inner opening and outer opening.

* * * * *